United States Patent
Paar et al.

(10) Patent No.: US 10,801,667 B2
(45) Date of Patent: Oct. 13, 2020

(54) LUBRICATION INJECTOR WITH ENERGY HARVESTING

(71) Applicant: Graco Minnesota Inc., Minneapolis, MN (US)

(72) Inventors: Benjamin J. Paar, Minneapolis, MN (US); Eric J. Mjolhus, Ramsey, MN (US); Igor V. Radzyuk, Ramsey, MN (US); Andrew M. Grunloh, Columbia Heights, MN (US); Anna M. Hegdahl, Brooklyn Park, MN (US); Benjamin R. Stassen, Faribault, MN (US); Christopher J. Stack, Minneapolis, MN (US); Walter L. Franklin, III, Eagan, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 489 days.

(21) Appl. No.: 15/570,176

(22) PCT Filed: Apr. 27, 2016

(86) PCT No.: PCT/US2016/029529
§ 371 (c)(1),
(2) Date: Oct. 27, 2017

(87) PCT Pub. No.: WO2016/176308
PCT Pub. Date: Nov. 3, 2016

(65) Prior Publication Data
US 2018/0135801 A1 May 17, 2018

Related U.S. Application Data

(60) Provisional application No. 62/154,211, filed on Apr. 29, 2015.

(51) Int. Cl.
*F16N 21/04* (2006.01)
*F16N 7/38* (2006.01)
(Continued)

(52) U.S. Cl.
CPC ............. *F16N 21/04* (2013.01); *F16N 7/385* (2013.01); *F16N 29/04* (2013.01); *H02N 2/183* (2013.01); *F16N 2260/00* (2013.01)

(58) Field of Classification Search
CPC ...... F16N 21/04; F16N 29/04; F16N 2260/00; F16N 7/385; H02N 2/183
See application file for complete search history.

(56) References Cited

U.S. PATENT DOCUMENTS 2,667,235 A * 1/1954 Le Clair ................. F16N 29/04
184/7.4
2,914,686 A 11/1959 Clements et al.
(Continued)

FOREIGN PATENT DOCUMENTS

| KR | 100783938 B1 | 2/2007 |
|---|---|---|
| WO | WO2014/158406 A1 | 10/2014 |
| WO | WO2015/021260 A1 | 2/2015 |

OTHER PUBLICATIONS

International Search Report and Written Opinion from PCT Application Serial No. PCT/US2016/029529, dated Sep. 2, 2016, 13 pages.

*Primary Examiner* — Michael R Mansen
*Assistant Examiner* — Mark K Buse
(74) *Attorney, Agent, or Firm* — Kinney & Lange, P.A.

(57) ABSTRACT

A system for harvesting energy from a lubrication event includes a fluid pump, a fluid injector, an energy harvesting device, a wireless transmitter, and a controller unit. The fluid injector receives fluid from the fluid pump. The fluid injector is connected to the energy harvesting device, which is configured to produce electrical energy in response to a (Continued)

firing of the fluid injector. Electrical energy produced by the energy harvesting device powers the wireless transmitter, which is configured to transmit a wireless signal. The wireless signal indicates that the fluid injector fired. The wireless signal is received by the controller unit, which controls the fluid pump.

19 Claims, 6 Drawing Sheets

(51) Int. Cl.
    *F16N 29/04*     (2006.01)
    *H02N 2/18*     (2006.01)

(56) References Cited

U.S. PATENT DOCUMENTS

| | | | |
|---|---|---|---|
| 3,171,989 A | 3/1965 | Hatschek | |
| 3,392,979 A | 7/1968 | Wilska | |
| 3,793,561 A | 2/1974 | Lundh | |
| 3,911,390 A | 10/1975 | Myers | |
| 3,987,320 A | 10/1976 | Merhar | |
| 4,059,999 A | 11/1977 | Engeler et al. | |
| 4,383,239 A | 5/1983 | Robert | |
| 4,546,658 A | 10/1985 | Rocha et al. | |
| 4,893,697 A * | 1/1990 | Tosi | F16N 13/16 184/29 |
| 4,937,555 A | 6/1990 | Litzkow et al. | |
| 5,823,295 A * | 10/1998 | Griffith | F16N 7/385 184/6.4 |
| 6,535,135 B1 * | 3/2003 | French | B61K 9/04 340/682 |
| 7,806,235 B1 * | 10/2010 | Roys | F16K 17/042 184/6.4 |
| 2007/0137936 A1 * | 6/2007 | Akechi | G01P 13/0033 184/14 |
| 2010/0288788 A1 | 11/2010 | Ophardt | |
| 2011/0204752 A1 | 8/2011 | Gao et al. | |
| 2012/0132303 A1 * | 5/2012 | Conley | F16N 7/14 137/565.17 |
| 2012/0132483 A1 * | 5/2012 | Conley | F16N 7/38 184/6.4 |
| 2012/0228333 A1 * | 9/2012 | Ophardt | B05B 11/308 222/192 |
| 2013/0015019 A1 * | 1/2013 | Kuvaja | F16N 7/38 184/26 |
| 2014/0090929 A1 * | 4/2014 | Powell | F16N 25/02 184/6.4 |
| 2015/0345701 A1 * | 12/2015 | Conley | F16N 29/04 184/6.4 |
| 2016/0186740 A1 * | 6/2016 | Klaphake | G01F 23/40 417/45 |

\* cited by examiner

Fig. 4D

LUBRICATION INJECTOR WITH ENERGY HARVESTING

BACKGROUND

Lubrication of a machine is critical for proper operation. Many machines now employ automatic lubrication systems that can route lubricant to a plurality of individual point lubrication injectors. Each injector can be configured dispense a set amount of lubricant, such as grease, to the machine during a lubrication event. In order to ensure that the machine is properly lubricated, it is desirable to monitor each injector to confirm that a lubrication event has occurred.

One way to monitor each injector is to visually confirm that the injector has dispensed lubricant. Another way to monitor each injector is to include pressure sensors in fluid lines, flow monitors, or a proximity switch that monitors an indicator pin on an injector. These monitoring techniques, however, require wiring from either a pump or a controller to the injector. The wires however can be vulnerable to damage during operation of the machine, which can lead to time consuming and expensive repairs. In light of these shortcomings, there is a need for an improved device for monitoring a lubricant injector in a machine.

SUMMARY

According to one embodiment of the present disclosure, a system includes a fluid pump, a fluid injector, an energy harvesting device, a wireless transmitter, and a controller unit. The fluid injector receives fluid from the fluid pump. The fluid injector is connected to the energy harvesting device, which is configured to produce electrical energy in response a firing of the fluid injector. Electrical energy produced by the energy harvesting device powers the wireless transmitter, which is configured to transmit a wireless signal. The wireless signal indicates that the fluid injector fired. The wireless signal is received by the controller unit, which controls the fluid pump.

According to another embodiment, a system for converting mechanical energy from a fluid dispensing event into electrical energy includes a fluid injection module and an energy harvesting device. The fluid injection module includes an indicator pin that moves during the dispensing event. The energy harvesting device is attached to the dispensing module and includes a chamber, an actuation element, a striking element, a piezoelectric element, and a transmitter. An internal surface of the energy harvesting device defines the chamber. The chamber is sized to allow the actuation element to be disposed therein. The actuation element is configured to engage the indicator pin of the fluid injection module and move from a first position to a second position. The actuation element is connected to a striking element, which is movable between a first position and a second position. The chamber is also sized to allow a piezoelectric element to be disposed therein. The piezoelectric element is located near the striking element. The piezoelectric element is attached to the transmitter, which is configured to generate a wireless signal.

According to yet another embodiment of the present disclosure, a method of producing a wireless signal from a fluid dispensing device includes dispensing a volume of a fluid from a fluid injector. This is followed by impacting a piezoelectric element with a striking element. Impacting the piezoelectric element generates an electrical energy, which powers a transmitter. The transmitter transmits a wireless electric signal from the wireless transmitter to a controller unit.

DETAILED DESCRIPTION

This disclosure is generally related to an energy harvesting device that is able to convert mechanical energy generated from a fluid injector during a fluid dispensing event into electrical energy. The fluid can be a lubricant. The generated electrical energy is used to power a wireless signal transmitter that sends a signal to a controller unit. The signal indicates that a successful fluid dispensing event has occurred. In order to better understand the claims herein, the following paragraphs will describe a non-limiting embodiment of this disclosure.

Figure 1:
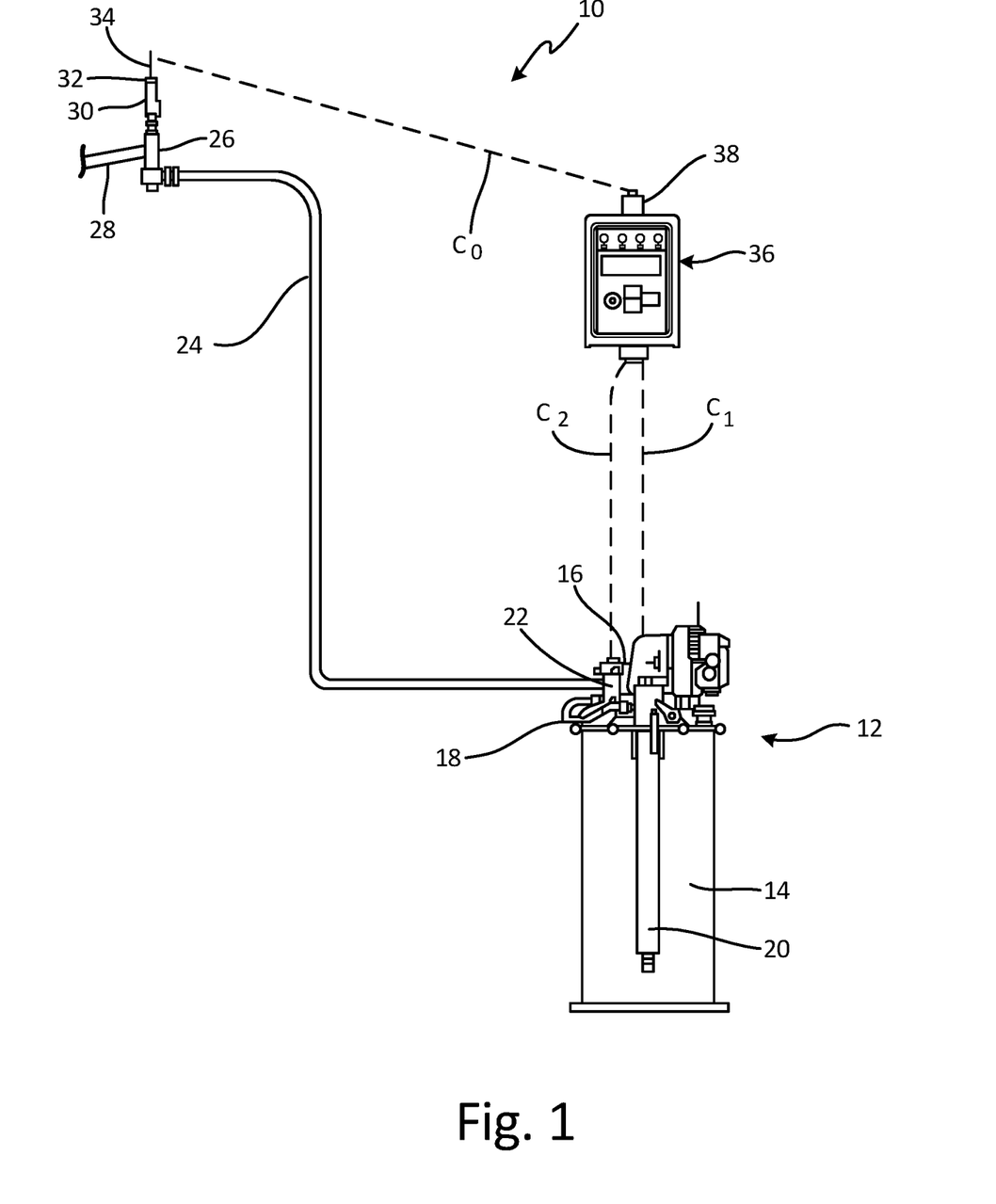
FIG. 1 is a schematic diagram of a lubrication system including a pump, a lubricant injector, an energy harvesting device, a transmitter, and a controller.

FIG. 1 is a schematic diagram of lubrication system 10, which is a system that receives, stores, and supplies lubricant fluid. Lubrication system 10 includes local assembly 12 with lubricant reservoir 14, motor 16, pump 18, fluid tube 20, input/output manifold 22, lubricant work line 24, lubricant injector 26, and lubricant dispensing line 28. FIG. 1 also illustrates energy harvesting device 30, which is attached to transmitter 32 including antenna 34. FIG. 1 further illustrates lubrication controller 36, which includes wireless receiver 38.

Local assembly 12 is a dedicated lubrication assembly for use with lubricated machinery such as pumps, pistons, seals, bearings, and/or shafts. Local assembly 12 can, for example, be a lubrication assembly mounted on a vehicle or other mobile device for lubrication of mobile components. Lubricant reservoir 14 is a tank or other container for lubricant fluid. In some embodiments, lubricant reservoir 14 can be a substantially cylindrical drum. Motor 16 drives pump 18, which in turn draws lubricant from lubricant reservoir 14 through fluid tube 20, and forces lubricant into lubricant work line 24 through input/output manifold 22, under pressure. Motor 16 can, for example, be an electrical or pneumatic motor. In one embodiment pump 18 is a piston pump.

In alternative embodiments, pump 18 can be a reciprocating pump of any other kind, or a gear pump.

Fluid tube 20 is a lubricant-carrying tube that extends from a top location of lubricant reservoir 14 near input/output manifold 22 to a bottom location near the base of lubricant reservoir 14. Although fluid tube 20 is depicted as a vertical cylindrical tube, alternative embodiments can be bent, be angled, or otherwise have other shapes. Fluid tube 20 can, for example, be a nested tube with concentric inlet and outlet channels. Inlet/outlet manifold 22 provides the entrance and exit for lubricant into or from lubricant reservoir 14. Inlet/output manifold 22 connects to fluid tube 20 and lubricant work line 24. Lubricant work line 24 is a fluid distribution line that carries lubricant from input/output manifold 22 to lubricant injector 26, which can be distributed across a plurality of lubricated components, such as pistons, seals, bearings, or shafts of a truck through lubricant dispensing line 28. Although only one lubricant work line 24 is shown, some embodiments of local assembly 12 can comprise multiple lubricant work lines, all connected to input/output manifold 22.

Lubricant injector 26 is an injector for grease, oil, or other lubricant materials that are disposed at the locations of lubricated components. Lubricant injector 26 can, for example, be a spring-biased injector pressurized by motor 16 that fires to supply a metered quantity of lubricant fluid during a lubrication event. As stated above, although one lubricant injector is illustrated, in other embodiments lubrication system 10 can include a bank of injectors that are supplied with lubricant from reservoir 14.

Energy harvesting device 30 is attached to lubricant injector 26. If lubrication system 10 includes a bank of lubricant injector 26, then each injector 26 can be attached to an individual energy harvesting device 30. As will be described further below, energy harvesting device 30 converts mechanical energy from lubricant injector 26 into electrical energy. Lubricant injector 26 generates mechanical energy through movement of an indicator pin (not shown) that moves in response to the injection of lubricant from injector 26.

Transmitter 32 is connected by electrical wire to energy harvesting device 30. Transmitter 32 uses the electrical energy generated by energy harvesting device 30 to send an output signal $C_O$, such as a wireless signal to lubrication controller 36. Signal $C_O$ is sent via antenna 34 on transmitter 32 to wireless receiver 38 on lubrication controller 36. Signal $C_O$ can transmit at a specific frequency that is recognized by wireless receiver 38. In embodiments of lubrication system 10 that include multiple energy harvesting devices 30, each energy harvesting device 30 can be linked to an individual transmitter 32, each of which generates a signal having a different frequency from that of another transmitter 32. Each individual signal is recognized and received by lubrication controller 36. Signal $C_O$ indicates that a volume of a lubricant has been dispensed from lubricant injector 26. This is because the transmission of signal $C_O$ is predicated on the conversion of the mechanical energy generated by injector 26 into electrical energy by energy harvesting device 30. The generation of mechanical energy from lubricant injector 26 and conversion of that energy to electrical energy will be further discussed below.

Lubrication controller 36 is a logic-capable device such as a dedicated microprocessor or collection of microprocessors, or a non-dedicated computer loaded with appropriate control software. Wireless receiver 38 of lubrication controller 36 receives signal $C_O$ from transmitter 32. Additionally, lubrication controller 36 receives signals $C_1$ reflecting states of local assembly 12, and controls motor 16 and actuators of local assembly 12 via output signals $C_2$. Lubrication controller 36 can be a part of local assembly 12, or can be a remote controller that communicates with local assembly 12 via a remote data connection such as a wireless connection. Lubrication controller 36 can include user interface components such as a screen, keypad, and/or communication transceiver to provide data to local or remote users, and accept user input commands. In some embodiments lubrication controller 36 can output alarm or alert messages (e.g. via digital signals, lights, and/or sounds) indicating changes in operation of local assembly 12 or a misfire of lubricant injector 26.

Figure 2A:
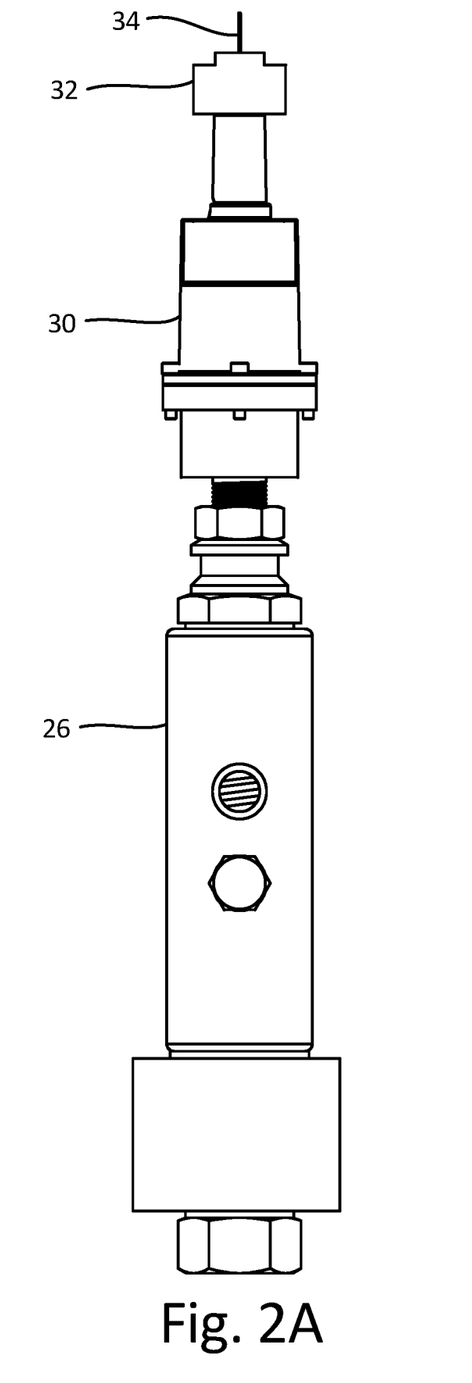
FIG. 2A is a side view of the lubricant injector, energy harvesting device, and transmitter.

FIG. 2A is a side view of lubricant injector 26, energy harvesting device 30, and transmitter 32. As illustrated, lubricant injector 26 is connected to energy harvesting device 30 and energy harvesting device 30 is connected to transmitter 32, which includes antenna 34.

Figure 2B:
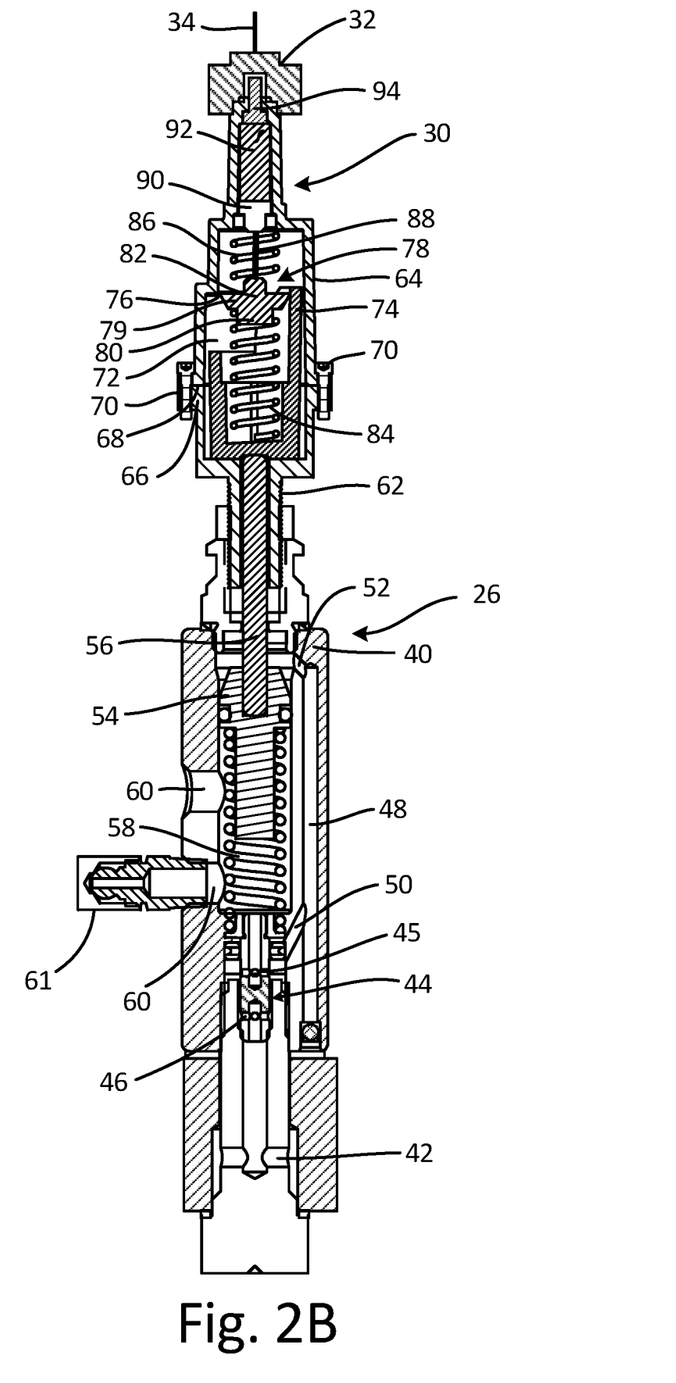
FIG. 2B is a sectional view of the lubricant injector, energy harvesting device, and transmitter rotated ninety degrees with respect to FIG. 2A.

FIG. 2B is a sectional view illustrating injector 26, energy harvesting device 30, and transmitter 34 and is axially rotated ninety degrees with respect to FIG. 2A. FIG. 2B illustrates components of injector 26 including injector housing 40, lubricant inlet 42, metering piston 44, metering piston passages 45 and 46, lubricant passage 48, fluid passage openings 50 and 52, dispensing piston 54, indicator pin 56, dispensing chamber 58, lubricant outlets 60, and blocker 61.

Energy harvesting device 30 as illustrated includes energy harvesting device threaded end 62, housing 64, threaded end flange 66, housing flange 68, bolts 70, first chamber 72, plunger 74, shoulder 76, striking element 78, striking element protrusion 79, striking element first end 80, striking element second end 82, drive spring 84, second chamber 86, return spring 88, anvil 90, piezoelectric element 92, and dual electrode 94.

Lubricant injector 26 can be attached to a structure such as an axle of a vehicle. Lubricant inlet 42 is joined by lubricant work line 24 to pump 18. Metering piston 44 is in fluid communication with lubricant inlet 42. Metering piston 44 includes passages 45 and 46, which selectively communicate with opening 50 of lubricant passage 48. Lubricant passage 48 includes openings 50 and 52 and routes lubricant between metering piston 44 and a topside of dispensing piston 54 adjacent indicator pin 56. Lubricant outlets 60 are located approximately in the middle of injector housing 40 and can be connected to lubricant dispensing line 28 (shown above in FIG. 1). As illustrated, injector includes two lubricant outlets 60 each of which can be connected to separate outlet lines or one of outlets 60 can be blocked for example by blocker 61 as shown in FIG. 2B.

Energy harvesting device 30 is attached to lubricant injector 26 through a treaded connection. In alternative embodiments, energy harvesting device 30 can be welded to lubricant injector 26 or otherwise integral to injector 26. Threaded end 62 is adapted to receive indicator pin 56. Housing 64 is attached to threaded end 62 of energy harvesting device 30 by threaded end flange 66 and housing flange 68, which are attached together by bolts 70. Threaded end 62 is formed from durable material that can withstand relatively harsh operating conditions such as high heat and high vibrations during operation of the machine to which energy harvesting device 30 is attached. Housing 64 can be formed from a material that has a suitably high tensile strength and possesses suitable durability over a wide temperature range.

First chamber 72 is located within housing 64 near threaded end 62. Plunger 74 is disposed within first chamber 72. Plunger 74 is elastic and can be formed from a polymer such as polycarbonate or acrylonitrile butadiene. Striking element 78 is disposed within plunger 74. Striking element includes first end 80 and opposite second end 82. First end 80 is in contact with drive spring 84. Drive spring 84 is disposed within and attached to plunger 74 as well as striking element 78.

Shoulder 76 divides first chamber 72 from second chamber 86 and serves as an obstruction element for striking element 78. Protrusion 79 of striking element 78 and plunger 74 engage shoulder 76. A central axis of second chamber 86 is offset from a central axis of first chamber 72. Second chamber 86 is sized to allow striking element 78 and a portion of plunger 74 to pass through second chamber 86.

Anvil 90 is disposed within second chamber 86 and fixed to an end of piezoelectric element 92. Return spring 88 is attached to striking element 78 and anvil 90. Dual electrode 94 includes positive and negative terminals that carry electrical energy from piezoelectric element 92 to transmitter 32. Dual electrode 94 is fixed to an opposite end of piezoelectric element 92 and connects to transmitter 32

In operation, lubricant injector 26 is configured to deliver a lubricant such as grease to components of a machine as described generally above. Lubricant injector 26 as illustrated in FIG. 2B is shown in a dispensing mode. In order to dispense lubricant, a volume of lubricant is supplied from pump 18 to lubricant injector 26 through lubricant inlet 42 at a pre-determined rate set by motor 16, which is activated by controller 36. After entering lubricant inlet 42, the lubricant builds up pressure inside lubricant injector 26 as more lubricant is delivered. When the pressure of lubricant reaches a predetermined level, metering piston 44 is moved upward. This aligns an opening of metering piston passage 46 with opening 50 of lubricant passage 48. The lubricant then flows through lubricant passage 48 and exits passage 48 through opening 52 adjacent the top of dispensing piston 54. Metering piston 44 then moves back down to its original position. The lubricant exiting opening 52 exerts force on the top of dispensing piston 54. The force is sufficient to move dispensing piston 54 downward. The downward movement of dispensing piston 54 forces a volume of lubricant in dispensing chamber 58 to exit through lubricant outlets 60 and into lubricant dispensing line 28.

After the lubricant has been dispensed from lubricant outlets 60, lubricant injector 26 resets. In order to reset, the lubricant that pushed dispensing piston 54 down is drawn back through opening 52 and into lubricant passage 48. The lubricant flowing through passage 48 exits through opening 52. At this stage opening 52 is aligned with passage 45 of metering piston 44 as a result of the downward movement of piston 44. The lubricant then flows through passage 45 and enters dispensing chamber where the lubricant builds up enough pressure to move dispensing piston 54 upward. As dispensing piston 54 moves upward, indicator pin 56, which is integral to piston 54, moves from a first position, illustrated in FIG. 2B to a second position in which indicator pin 56 engages plunger 74 of energy harvesting device 30. When indicator pin 56 is in the second position, lubricant injector 26 is fully reset and ready to dispense the lubricant inside dispensing chamber 58.

As will be described further below, when lubricant injector 26 is reset, indicator pin 56 engages plunger 74, which ultimately results in the generation of electrical energy from piezoelectric element 92. The electrical energy generated by piezoelectric element 92 is used to power transmitter 32, which sends wireless electric signal $C_0$ to lubrication controller 36. Because piezoelectric element 92 only generates electrical energy in response to indicator pin being in the second position as a result of lubricant injector 26 resetting, wireless electric signal $C_0$ sent by transmitter 32 is indicative of injector 26 dispensing lubricant during a lubrication event. Once controller 36 receives $C_0$ wireless electric signal, controller 36 can activate motor 16 of pump 18 to send another volume of lubricant to injector 26.

Figure 3A:
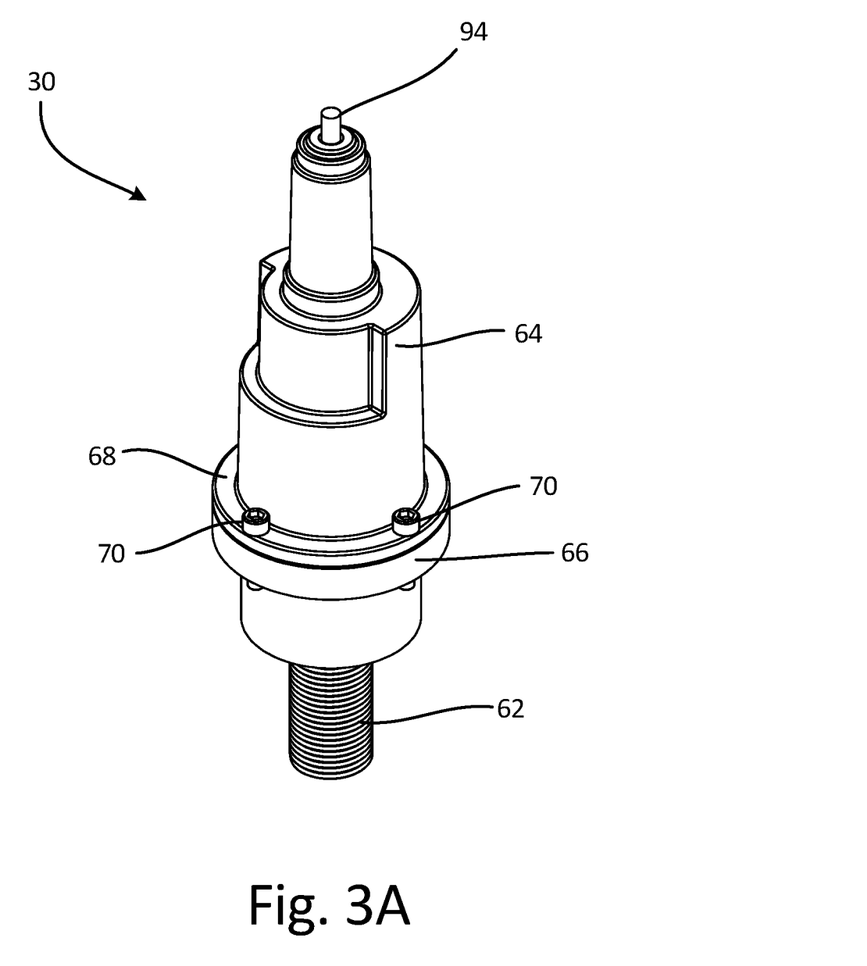
FIG. 3A is a perspective view of the energy harvesting device.
Figure 3B:
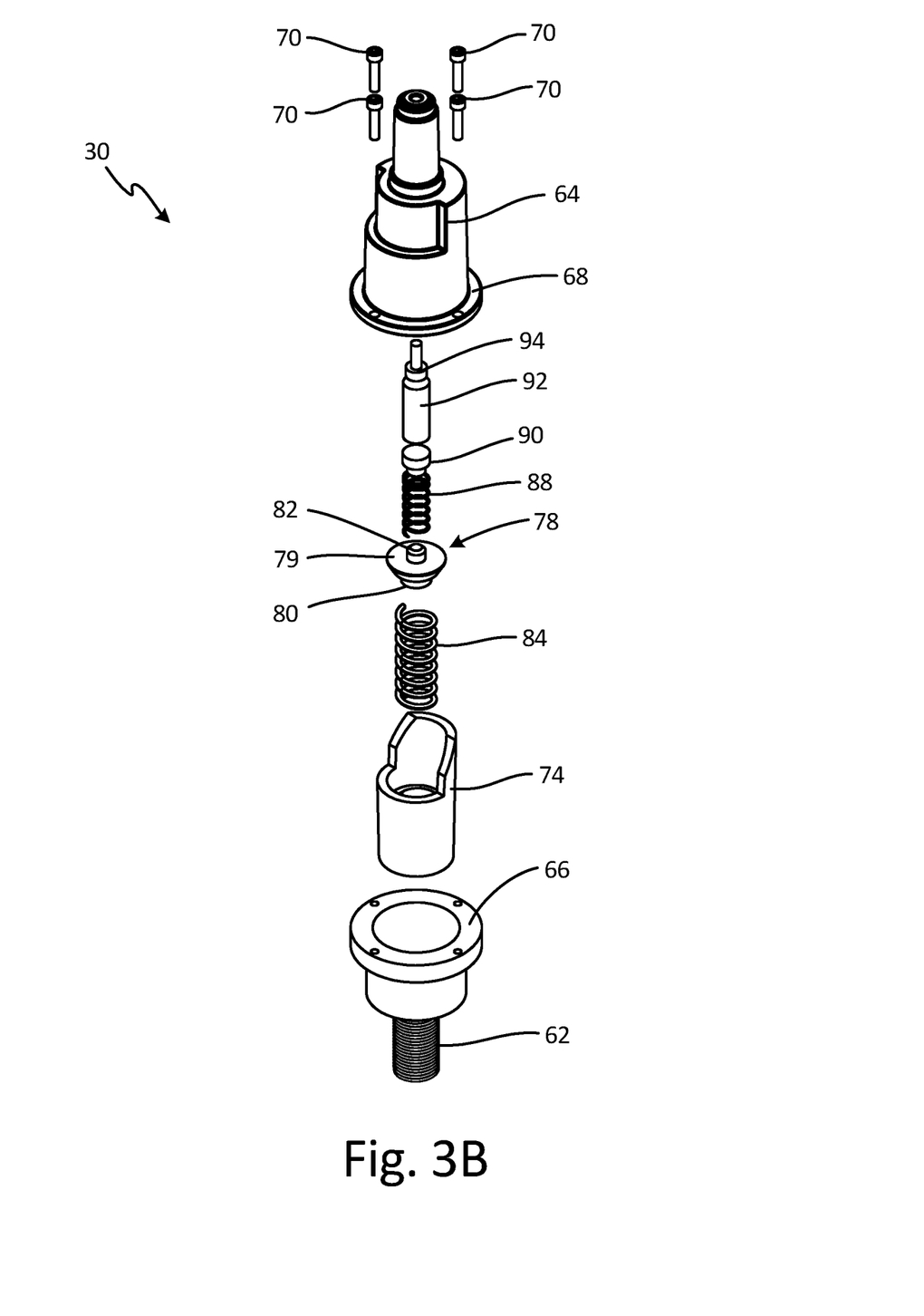
FIG. 3B is an exploded view of the energy harvesting device.
Figure 4A:
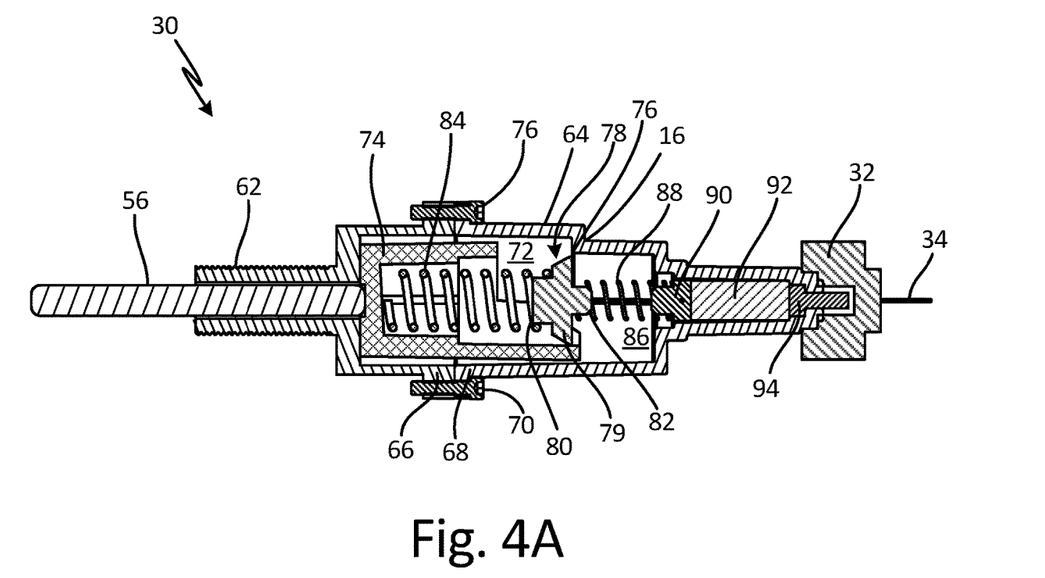
FIG. 4A is a sectional view of the energy harvesting device showing the energy harvesting device at rest with the indicator pin in a first position.
Figure 4B:
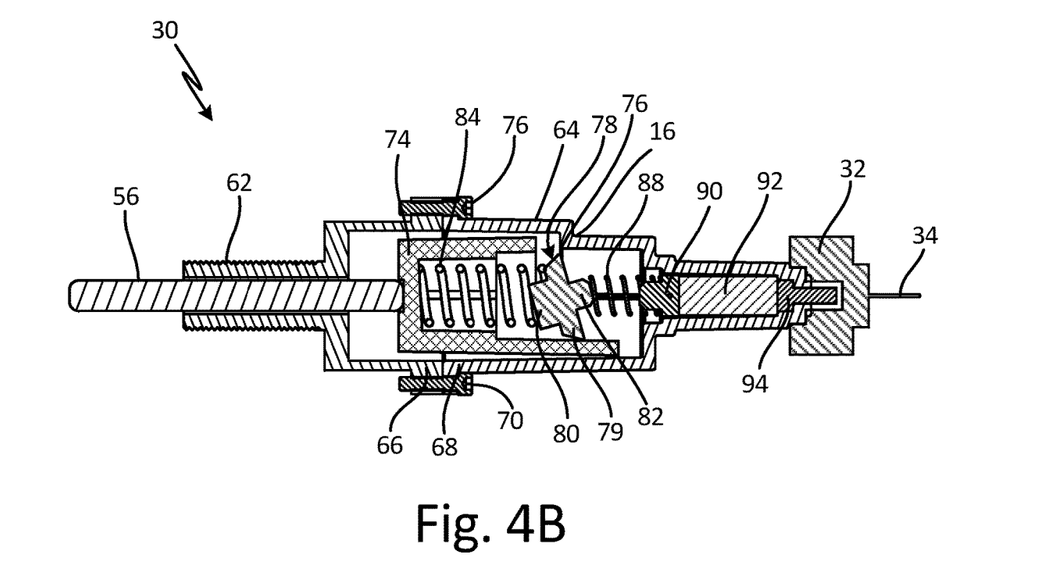
FIG. 4B is a sectional view of the energy harvesting device showing the energy harvesting device in compression with the indicator pin in a second position.
Figure 4C:
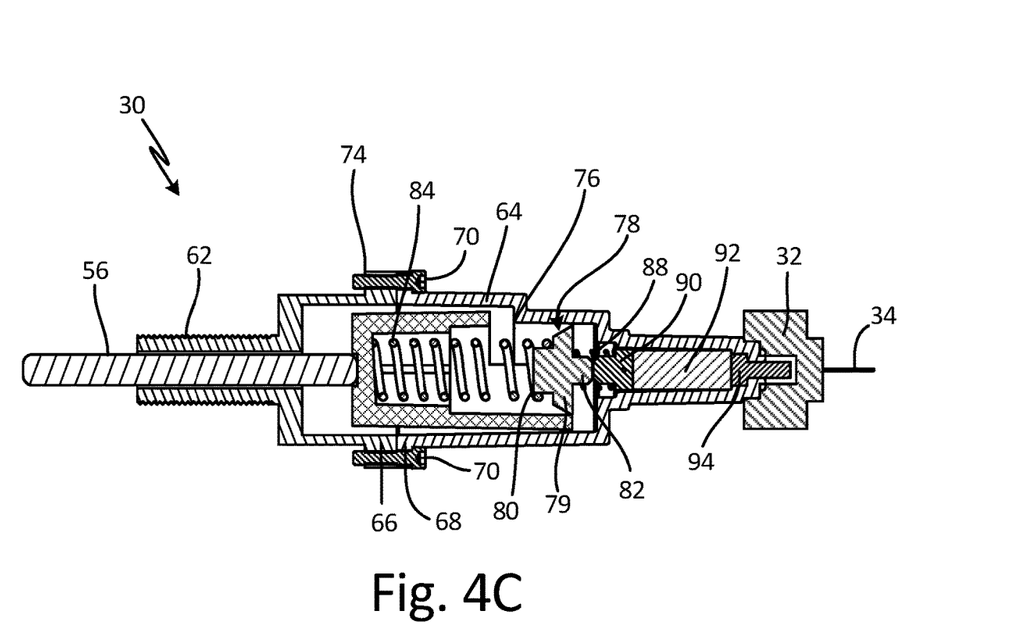
FIG. 4C is a sectional view of the energy harvesting device showing a striking element in contact with an anvil element.
Figure 4D:
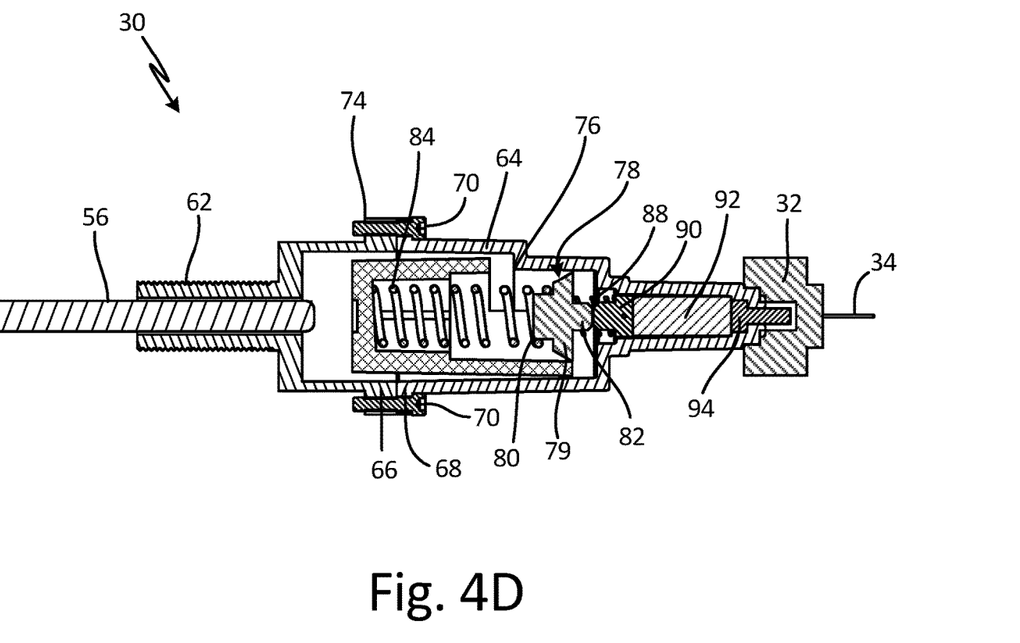
FIG. 4D is a sectional view of the energy harvesting device during reset where the indicator pin is in the first position.

The operation of energy harvesting device 30 will be described below. FIG. 3A is a perspective view of energy harvesting device 30. FIG. 3B is an exploded view of energy harvesting device 30 showing the individual components of energy harvesting device 30 identified in FIGS. 2A and 2B. Energy harvesting device operates in four stages. The first stage is shown in FIG. 4A in which energy harvesting device 30 is at rest. The second stage is shown in FIG. 4B in which indicator pin 56 is in the second position and engaging plunger 74. The third stage is shown in FIG. 4C in which striking element 78 is in contact with anvil 90. The fourth state is shown in FIG. 4D in which indicator pin 56 has moved back to the first position and energy harvesting device 30 is about to reset.

FIG. 4A is a partial cross-sectional view of energy harvesting device 30 and transmitter 32. FIG. 4A shows many of the same components shown in FIGS. 2A, 2B and 3. FIG. 4A shows energy harvesting device 30 when lubricant injector 26 is in the dispensing mode as described above with respect to FIG. 2B.

As illustrated in FIG. 4B, when indicator pin 56 moves into the second position, it passes through threaded end 62 of energy harvesting device 30 and engages plunger 74. As indicator pin 56 engages plunger 74, plunger 74 is compressed, which in turn compresses drive spring 84. As drive spring 84 is compressed, potential energy is built up in drive spring 84. Eventually, the potential energy stored in drive spring 84 reaches a level that is sufficient to disengage plunger 74 and protrusion 79 of striking element and from shoulder 76. As illustrated, striking element 78 is tilted in response to the potential energy that is stored as drive spring 84 is compressed. Once protrusion 79 and plunger 74 are disengaged from shoulder 76, the potential energy that was stored in drive spring 84 is converted into kinetic energy at a level that is sufficient to drive striking element 78 towards anvil 90.

FIG. 4C shows striking element 78 engaged with anvil 90. The impact of striking element 78 on anvil 90 transmits a force from striking element 78 through anvil 90 and to piezoelectric element 92.

The transmission of mechanical energy through piezoelectric element 92 is at a level sufficient to cause deformation in piezoelectric element 92, which produces electrical energy. A suitable material for piezoelectric element 92 is lead zirconate titanate although other crystalline piezoelectric materials are contemplated. The electrical energy is sent through dual electrode 94 to transmitter 32. As described above with respect to FIG. 1, transmitter 32 is powered by the electricity generated by piezoelectric element 92 in response to striking element 78 impacting anvil 90. Once transmitter 32 is supplied with electrical energy it sends a wireless signal to lubrication controller 36. The electrical energy generated by piezoelectric element 92 for example, can range up to 3V, which can allow transmitter 32 to send a wireless signal up to 100 feet.

FIG. 4D shows energy harvesting device 30 as it is reset. As illustrated indicator pin 56 has moved from the second position to the first position. Indicator pin 56 is moved to the first position as dispensing piston 54 is moved downward, as described above with respect to FIG. 2B. In order for energy harvesting device 30 to reset, both plunger 74 and striking element 78 move from the second position back to the first position. This is driven by return spring 88, which is compressed by the movement of striking element 78 towards anvil 90. Return spring 88 has a lower spring constant than drive spring 84 that is set so as not to impede the compression of drive spring 84. The potential energy in return spring 88 builds as plunger 74 and striking element 78 moves from the first to second position. Once the potential energy in return spring 88 is converted to kinetic energy, plunger 74 and striking element 78 are driven back to the first position. Once plunger 74 and striking element 78 are back in the first position, energy harvesting device 30 is reset and in a configuration as shown with respect to FIG. 4A.

There are many reasons to use energy harvesting device 30 including the following non-limiting reasons. First, it is vitally important to ensure that machinery components are properly lubricated. But it can very difficult for a machine operator to be certain that a lubrication event has occurred. This can be due to the location of lubricant injector 26. For example, lubricant injector 26 can be disposed in a location that is not directly visible to an operator. Additionally, if a particular machine includes a plurality of lubricant injectors 26, it can be difficult to continually monitor each of injectors 26 to ensure that a lubrication event has occurred.

The feedback system that is realized by transmitting a wireless signal with transmitter 32 that is received by lubrication controller 36, however, provides instant confirmation to an operator that lubricant injector 26 has fired. That is, an operator will have instant access to data received by lubrication controller 36, which can be sent to a computer in order for the operator to determine that lubricant injector 26 is functioning properly. Additionally, data relating to lubrication events can be collected by lubrication controller 36, which can help to substantially eliminate the need for regular inspections of injector 26. This is because the operator will instantly know whether lubricant injector 26 is functioning or not by analyzing data collected by controller 36. Additionally, the continuous collection of data by controller 36 can alert an operator to a lubrication event failure in real time so that the operator can take any action needed to avoid permanent damage to the machine.

Moreover, adding transmitter 32 and energy harvesting device 30 to lubricant injector 26 eliminates the need to connect lubricant injector 26 to lubrication controller 36 by a wire in order to generate feedback. Wiring lubricant injector 26 to lubrication controller 36 increases overall system complexity, which can result in increased assembly time and costs. Additionally, wires can be destroyed during operation of the machine, which can lead to expensive and time consuming repairs.

DISCUSSION OF POSSIBLE EMBODIMENTS

The following are non-exclusive descriptions of possible embodiments of the present invention.

A system includes a fluid pump; a fluid injector in communication with the fluid pump; an energy harvesting device connected to the fluid injector and configured to produce electrical energy in response to a firing of the fluid injector; a wireless transmitter powered by the electrical energy from the energy harvesting device and configured to transmit a wireless signal indicating that the fluid injector fired; and a controller unit configured to receive the wireless signal and control the fluid pump.

The system of the preceding paragraph can optionally include, additionally and/or alternatively, any one or more of the following features, configurations and/or additional components:

The system can further include a second fluid injector in communication with the pump; and a second energy harvesting device connected to the second fluid injector and configured to generate a second electrical signal.

The system can further include a second transmitter connected to the second energy harvesting device and configured to receive the second electrical signal from the second energy harvesting device and transmit a second wireless signal.

The controller can configured to receive the second wireless signal.

The transmitter can be further connected to the second energy harvesting device.

The energy harvesting device can further include a threaded end attached to the fluid injector a housing attached to the threaded end; a passage defined by an internal surface of the housing; an elastic actuation element disposed within the passage and located near the threaded end; a striking element attached to the actuation element and actuatable between a first position and a second position, the striking element comprising: a first end connected to the actuation element; and a second end generally opposite the first end; a drive spring attached to the actuation element and the striking element; and a piezoelectric element disposed within the internal chamber near the second end of the striking element and connected to the transmitter.

The system can further include an indicator pin movable between a first position and a second position, wherein the indicator pin engages the striking element when the indicator pin is in the second position.

The system can further include a first chamber; and a second chamber, wherein a central axis of the first chamber is offset from a second axis of the second chamber.

The system can further include an obstruction element, wherein a portion of the striking element at or near the second end of the striking element is engaged with the obstruction element when the striking element is in the first position.

In the system a portion of the striking element at or near the second end of the striking element can be disengaged with the obstruction point when the striking element is in the second position.

The system can further include an anvil element attached to the piezoelectric element and positioned to be in contact with the striking element when the striking element is in the second position.

The system can further include a return spring attached to the striking element and to the anvil element.

The piezoelectric element can be formed from a lead zirconate titanate material.

A system for converting mechanical energy from a fluid dispensing event into electrical energy among other possible things includes a fluid injection module comprising: an indicator pin that moves during the dispensing event; an energy harvesting device attached to the dispensing module and comprising: a chamber defined by an internal surface of the energy harvesting device; an actuation element disposed within the chamber and configured to engage the indicator pin and compress as the indicator pin moves from the first position to the second position; a striking element connected to the actuation element and movable between a first position and a second position, a piezoelectric element disposed within the chamber near the striking element; and a transmitter configured to generate a wireless signal attached to the piezoelectric element.

The system for converting mechanical energy from a fluid dispensing event into electrical energy of the preceding paragraph can optionally include, additionally and/or alternatively, any one or more of the following features, configurations and/or additional components:

The energy harvesting device can include a threaded external surface that is engaged with a threaded internal surface of the fluid dispensing module.

The indicator pin the indicator pin can move from the first position to the second position after the fluid dispensing module dispenses a fluid.

The transmitter can transmit an electrical signal indicating that the fluid dispensing event has occurred.

A method of producing a wireless signal from a lubrication device among other possible things dispensing a volume of a fluid from a fluid injector impacting a piezoelectric element with a striking element as the fluid is dispensed; powering a transmitter with electrical energy generated from the piezoelectric element; and transmitting a wireless electric signal injector from the wireless transmitter to a controller unit, the signal indicating that the volume of fluid has been dispensed from the injector.

The method of producing a wireless signal form a lubrication device of the preceding paragraph can optionally include, additionally and/or alternatively, any one or more of the following features, configurations and/or additional components:

The controller can be configured to indicate that the lubricant has been dispensed when the controller receives the wireless electric signal.

The controller can be configured to receive a plurality of wireless electric signals from a plurality of wireless signal transmitters.

Although the present invention has been described with reference to preferred embodiments, workers skilled in the art will recognize that changes may be made in form and detail without departing from the spirit and scope of the invention.

The invention claimed is:

1. A system comprising:
   a fluid pump;
   a fluid injector in communication with the fluid pump, the fluid injector comprising an indicator pin movable between a first position and a second position;
   an energy harvesting device connected to the fluid injector and configured to produce electrical energy in response to a firing of the fluid injector, the energy harvesting device comprising a threaded end attached to the fluid injector and adapted to receive the indicator pin;
   a wireless transmitter powered by the electrical energy from the energy harvesting device and configured to transmit a wireless signal indicating that the fluid injector fired; and
   a controller unit configured to receive the wireless signal and control the fluid pump.

2. The system of claim 1, and further comprising:
   second fluid injector in communication with the pump; and
   a second energy harvesting device connected to the second fluid injector and configured to generate a second electrical signal.

3. The system of claim 2, and further comprising:
   a second transmitter connected to the second energy harvesting device and configured to receive the second electrical signal from the second energy harvesting device and transmit a second wireless signal.

4. The system of claim 3, wherein the controller unit is configured to receive the second wireless signal.

5. The system of claim 1, wherein the energy harvesting device further comprises:
   a housing attached to the threaded end;
   a passage defined by an internal surface of the housing;
   an elastic actuation element disposed within the passage and located near the threaded end;
   a striking element attached to the actuation element and actuatable between a first position and a second position, the striking element comprising:
      a first end connected to the actuation element; and
      a second end generally opposite the first end;
   a drive spring attached to the actuation element and the striking element; and
   a piezoelectric element disposed within the internal chamber near the second end of the striking element and connected to the transmitter.

6. The system of claim 5, wherein
   the indicator pin engages the striking element when the indicator pin is in the second position.

7. The system of claim 5, wherein the passage further comprises:
   a first chamber; and
   a second chamber, wherein a central axis of the first chamber is offset from a second axis of the second chamber.

8. The system of claim 5, wherein the passage further comprises:
   an obstruction element, wherein a portion of the striking element at or near the second end of the striking element is engaged with the obstruction element when the striking element is in the first position.

9. The system of claim 8, wherein the portion of the striking element at or near the second end of the striking element is disengaged with the obstruction point when the striking element is in the second position.

10. The system of claim 5, wherein the device further comprises:
   an anvil element attached to the piezoelectric element and positioned to be in contact with the striking element when the striking element is in the second position.

11. The system of claim 10, wherein the device further comprises:
   a return spring attached to the striking element and to the anvil element.

12. The system of claim 5, wherein the piezoelectric element is formed from a lead zirconate titanate material.

13. A system for converting mechanical energy from a fluid dispensing event into electrical energy, the system comprising:
   a fluid injection module comprising:
      an indicator pin that moves during the dispensing event;
   an energy harvesting device attached to a dispensing module and comprising:
      a chamber defined by an internal surface of the energy harvesting device;
      an actuation element disposed within the chamber and configured to engage the indicator pin and compress as the indicator pin moves from the first position to the second position;
   a striking element connected to the actuation element and movable between a first position and a second position, a piezoelectric element disposed within the chamber near the striking element; and a transmitter configured to generate a wireless signal attached to the piezoelectric element.

14. The system of claim 13, wherein the energy harvesting device includes a threaded external surface that is engaged with a threaded internal surface of the fluid dispensing module.

15. The system of claim 13 wherein the indicator pin moves from the first position to the second position after the fluid dispensing module dispenses a fluid.

16. The system of claim 13, wherein the wireless signal transmitter transmits an electrical signal indicating that the fluid dispensing event has occurred.

17. A method of producing a wireless signal from a fluid dispensing device the method comprising:

dispensing a volume of a fluid from a fluid injector, the fluid injector comprising an indicator pin;

moving the indicator pin from a first position to a second position as the fluid is dispensed;

compressing an actuation element in an energy harvesting device with the indicator pin as the indicator pin moves from the first position to the second position, wherein the energy harvesting device comprises a threaded end attached to the fluid injector and adapted to receive the indicator pin;

impacting a piezoelectric element with a striking element when the indicator pin is in the second position;

powering a transmitter with electrical energy generated from the piezoelectric element; and transmitting a wireless electric signal from a wireless transmitter to a controller unit, the signal indicating that the volume of fluid has been dispensed from the injector.

18. The method of claim 17, wherein the controller is configured to indicate that the fluid has been dispensed when the controller receives the wireless electric signal.

19. The method of claim 17, wherein the controller is configured to receive a plurality of wireless electric signals from a plurality of transmitters.

* * * * *